(12) United States Patent
Naruse et al.

(10) Patent No.: US 7,297,414 B2
(45) Date of Patent: Nov. 20, 2007

(54) GAS BARRIER FILM AND METHOD FOR PRODUCING THE SAME

(75) Inventors: Hideaki Naruse, Kanagawa (JP); Seiya Sakurai, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 314 days.

(21) Appl. No.: 10/953,563

(22) Filed: Sep. 30, 2004

(65) Prior Publication Data
US 2005/0112378 A1 May 26, 2005

(30) Foreign Application Priority Data

Sep. 30, 2003 (JP) ............................. 2003-342062
Feb. 13, 2004 (JP) ............................. 2004-036736

(51) Int. Cl.
*B32B 27/00* (2006.01)
*B32B 27/34* (2006.01)
*B32B 27/36* (2006.01)
*B32B 27/40* (2006.01)

(52) U.S. Cl. .................. 428/688; 428/428; 428/423.1; 428/425; 428/448; 428/473.5; 428/477.7; 428/480; 428/689

(58) Field of Classification Search ............. 428/411.1, 428/412, 423.1, 425.5, 424.7, 473.5, 474.4, 428/480, 448, 477.7, 688, 689
See application file for complete search history.

(56) References Cited

U.S. PATENT DOCUMENTS 5,814,373 A * 9/1998 White et al. ................. 427/386
6,492,026 B1 12/2002 Graff et al.

FOREIGN PATENT DOCUMENTS

| JP | 53-12953 | | 2/1978 |
| JP | 58-217344 | A | 12/1983 |
| JP | 7-81919 | A | 3/1995 |
| JP | 10-512104 | A | 11/1998 |
| JP | 11-102867 | A | 4/1999 |
| JP | 2002-532850 | A | 10/2002 |
| WO | WO 97/15947 | | 5/1997 |
| WO | WO 00/36665 | A1 | 6/2000 |

* cited by examiner

*Primary Examiner*—Thao Tran
(74) *Attorney, Agent, or Firm*—Sughrue Mion Pllc.

(57) ABSTRACT

Disclosed is a gas barrier film alternately comprising at least one inorganic layer and at least one organic layer on a resin base material having a glass transition temperature of 250° C. or higher. The gas barrier film can exhibit superior gas barrier property when it is used in image display devices such as liquid crystal display devices and organic EL devices.

15 Claims, 1 Drawing Sheet

GAS BARRIER FILM AND METHOD FOR PRODUCING THE SAME

BACKGROUND OF THE INVENTION

1. Field of the Invention

The present invention relates to a gas barrier film having superior gas barrier performance and a method for producing the same as well as an organic electroluminescence device (henceforth referred to as "organic EL device") utilizing the gas barrier film. More precisely, the present invention relates to a gas barrier film suitable as a substrate of various kinds of devices and a method for producing the same, as well as a flexible organic EL device utilizing the gas barrier film.

2. Description of the Background

Conventionally, gas barrier films prepared by forming a thin film of metal oxide such as aluminum oxide, magnesium oxide or silicon oxide on a surface of a plastic substrate or film have been widely used in packaging of articles which require shielding of various gases such as water vapor and oxygen, and packaging use for preventing deterioration of food, industrial materials, medical supplies and so forth. In addition to the packaging use, gas barrier films are recently coming to be used also in liquid crystal display devices, solar cells, EL devices and so forth.

In the course of development of image display devices such as liquid crystal display devices and EL devices in recent years, transparent base materials for forming these devices are required to satisfy highly sophisticated requirements in addition to suitability for production of lighter and larger devices, for example, they must have long term reliability and higher degree of freedom of the shape, they must enable display on a curved surface, and so forth. As a transparent base material that satisfies such sophisticated requirements, plastic base materials are beginning to be adopted as new base materials as an alternative to conventional glass substrates, which are heavy, readily broken and difficult to be formed with a larger size. Plastic base materials not only satisfy the aforementioned requirements, but also show more favorable productivity compared with glass substrates because a roll-to-roll system can be used for them, and therefore they are more advantageous also in view of cost reduction.

However, plastic base materials have a drawback that their gas barrier property is inferior to that of glass base materials. If a base material having poor gas barrier property is used, water vapor and air permeate the material to, for example, degrade liquid crystals in a liquid crystal cell, form display defects and thereby degrade display quality. In order to solve this problem, plastic films in which a metal oxide thin film is formed on a plastic film have been developed so far. Examples of such plastic films include those comprising a plastic film on which silicon oxide is vapor-deposited (Japanese Patent Publication (KOKOKU) No. 53-12953), those comprising a plastic film on which aluminum oxide is vapor-deposited (Japanese Patent Laid-open Publication (KOKAI) No. 58-217344) and so forth are known. These films have a water vapor barrier property of about 1 g/m²/day represented in terms of permeability.

The gas barrier performance required for plastic film substrates used for recently developed large-sized liquid crystal displays, high precision displays and so forth is about 0.1 g/m²/day in terms of water vapor barrier property. Furthermore, development of organic EL displays, high precision color liquid crystal displays and so forth has recently progressed, and therefore required are transparent base materials usable for these having further higher barrier performance, in particular, barrier performance of less than 0.1 g/m₂/day in terms of water vapor barrier ability, while maintaining transparency. In order to meet such a demand, recently studied is film formation by the sputtering method or CVD method as a means that can be expected to provide higher barrier performance, in which a thin film is formed by using plasma generated by glow discharge under a low pressure condition. Moreover, organic luminescence devices in which a barrier film having an alternate laminate structure of organic layers and inorganic layers is produced by the vacuum deposition method are proposed (e.g., International Patent Application Laid-open Publication in Japanese (KOHYO) No. 2002-532850 (claim 1, FIG. 1)).

However, in these methods for forming a thin film, an organic substance blown as a vapor of a high temperature condenses on a film and form a thin film, and the film is temporarily heated and causes partial deformation. As a result, the subsequent lamination step becomes uneven, and thus the methods have a problem that they cannot provide sufficient barrier ability. Moreover, in these methods for forming a thin film, the number of the lamination step increases, and thus they have a problem of high cost. Furthermore, when a surface of a plastic substrate showing high water absorption is treated, the absorbed moisture is vaporized, thus it requires long time to obtain vacuum, and therefore there is also a problem that the processing cost becomes high.

Further, as for heat resistance of base material films, for disposing TFT in the production of active matrix type image devices in recent years, heat resistance of a still higher level is required. For example, a method of forming a polycrystalline silicon film at a temperature of 300° C. or lower by plasma decomposition of a gas containing $SiH_4$ is disclosed in Japanese Patent Laid-open Publication (KOKAI) No. 7-81919 (claim 3, [0016] to [0020]). Moreover, a method of forming a semiconductor layer mixed with amorphous silicon and polycrystalline silicon on a polymer substrate at a temperature of 300° C. or lower by irradiation of an energy beam is disclosed in International Patent Application Laid-open Publication in Japanese No. 10-512104 [pages 14 to 22, FIG. 1, FIG. 7). Furthermore, a method of forming a polycrystalline silicon semiconductor layer on a plastic substrate provided with a thermal buffer layer at a temperature of 300° C. or lower by irradiation of a pulsed laser beam is disclosed in Japanese Patent Laid-open Publication No. 11-102867 (claims 1 to 10, [0036]).

As described above, various methods of forming a polycrystalline silicon film for TFT at a temperature of 300° C. or lower have been proposed, and therefore it is useful that the base materials have heat resistance for a temperature of 250° C. or higher. On the other hand, such methods for forming a semiconductor layer as described above use complicated configurations and apparatuses and require high cost, and therefore heat resistance for a temperature of 300° C. to 350° C. or higher is desired for plastics substrates.

U.S. Pat. No. 6,492,026 discloses a heat-resistant substrate having a barrier stack consisting of at least one inorganic layer and at least one polymer layer but it fails to show sufficient heat resistance.

SUMMARY OF THE INVENTION

The present invention was accomplished in view of the aforementioned problems, and an object of the present invention is to provide a gas barrier film that can exhibit superior gas barrier property when it is used in image display devices such as liquid crystal display devices and organic EL devices and a method for producing such a gas barrier film. Another object of the present invention is to provide an organic EL device utilizing such a gas barrier film.

The inventors of the present invention conducted various researches, and as a result, they found that the object of the present invention could be achieved with the gas barrier film described below. That is, the object of the present invention is achieved by a gas barrier film alternately comprising at least one inorganic layer and at least one organic layer on a resin base material having a glass transition temperature of 250° C. or higher.

As the resin used in the gas barrier film of the present invention, a resin having a spiro structure represented by the following formula (1) or a resin having a cardo structure represented by the following formula (2) can be used.

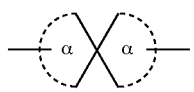

Formula (1)

In the formula (1), the rings α represent a monocyclic or polycyclic ring, and two of the rings are bound via a spiro bond.

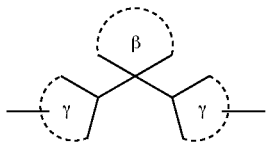

Formula (2)

In the formula (2), the ring β and the rings γ represent a monocyclic or polycyclic ring, and two of the rings γ may be identical or different and bond to one quaternary carbon atom in the ring β.

In the gas barrier film of the present invention, it is preferred that the inorganic layer and the organic layer are formed in this order on the resin base material having Tg of 250° C. or higher.

In the gas barrier film of the present invention, the organic layer preferably contains a crosslinked polymer compound obtained by polymerization of multifunctional monomers having an acryloyl group or a methacryloyl group as a main component.

The organic layer is preferably obtained by applying a solution containing a polymer having a hydrogen bonds-forming group and a metal alkoxide and drying the solution.

The gas barrier film of the present invention preferably has an oxygen permeability of 0.02 mL/m²·day·atm or lower at 23° C. and 90% of relative humidity, and a water vapor permeability of 0.02 g/m²·day or lower at 23° C. and 100% of relative humidity.

The gas barrier film of the present invention can be produced by a production method comprising forming at least one inorganic layer and at least one organic layer on a resin base material having Tg of 250° C. or higher.

In the aforementioned production method, as the resin base material, a resin having a spiro structure represented by the following formula (1) or a resin having a cardo structure represented by the following formula (2) can be used.

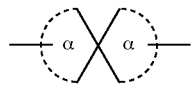

Formula (1)

In the formula (1), the rings α represent a monocyclic or polycyclic ring, and two of the rings are bound via a spiro bond.

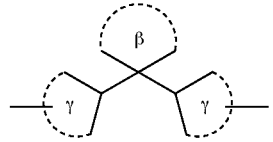

Formula (2)

In the formula (2), the ring β and the rings γ represent a monocyclic or polycyclic ring, and two of the rings γ may be identical or different and bond to one quaternary carbon atom in the ring β.

In the aforementioned production method, the organic layer is preferably formed by applying a composition containing a polymer having a hydrogen bond-forming group and a metal alkoxide and drying the composition at a temperature of 150 to 350° C.

The other object of the present invention is achieved with an organic electroluminescence device utilizing the aforementioned gas barrier film.

The gas barrier film of the present invention utilizes a resin having Tg of 250° C. or higher as a base material and alternately has at least one inorganic layer and at least one organic layer on the base material. With this configuration, the gas barrier film of the present invention exhibits superior heat resistance and superior gas barrier property. Further, by the method for producing a gas barrier film of the present invention, a gas barrier film having both of superior heat resistance and superior gas barrier property can be obtained.

Further, the organic EL device of the present invention utilizes the gas barrier film of the present invention as a substrate or a protective film. With this configuration, the organic EL device of the present invention can be a highly precise and highly durable organic EL device having a flexible substrate.

Because the gas barrier film of the present invention has superior gas barrier performance, it can be widely used as a substrate of image display devices such as liquid crystal display devices and organic electroluminescence devices.

BEST MODE FOR CARRYING OUT THE INVENTION

Figure 1:
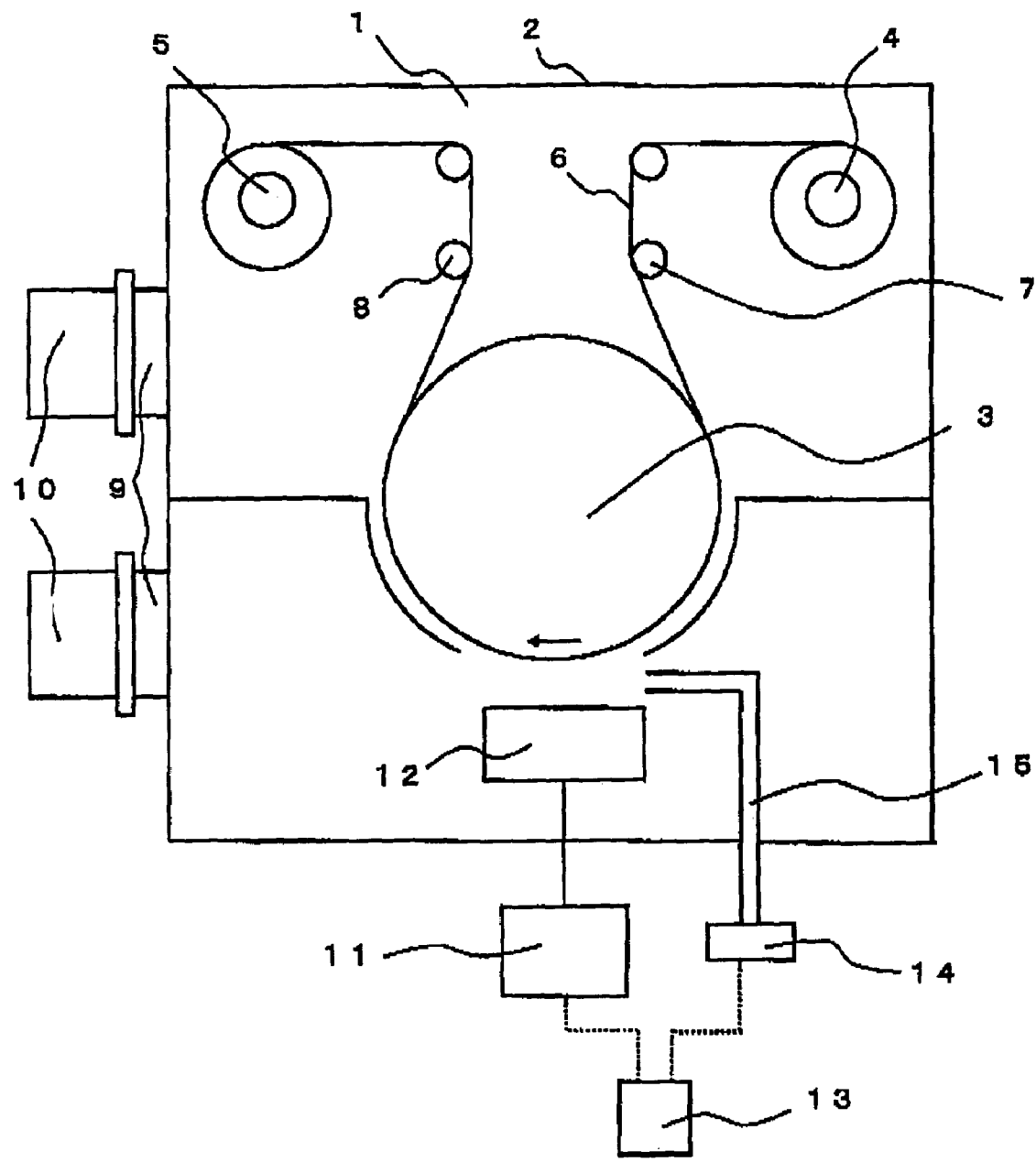
FIG. 1 is a schematic explanatory view of the roll-to-roll type sputtering apparatus used in Example 1. The sputtering apparatus 1 comprises a vacuum chamber 2, drum 3, feeding roller 4, rolling-up roller 5, plastic film 6, guide roller 7, guide roller 8, exhaust ports 9, vacuum pumps 10, electric discharge power source 11, cathode 12, controller 13, gas flow rate control unit 14, and reactive gas piping 15.

Hereafter, the gas barrier film of the present invention, the method for producing it, and the organic EL device utilizing the film will be explained in detail.

In the present invention, the term "to" is used to mean a range including the numerals indicated before and after the term as lower limit and upper limit values.

[Gas Barrier Film]

<Base Material>

The resin base material used in the gas barrier film of the present invention is not particularly limited so long as it has a glass transition temperature (Tg) of 250° C. or higher, and it may consist of a thermoplastic resin or a curable resin. The glass transition temperature of the resin is preferably 250 to 600° C., more preferably 300 to 550° C., still more preferably 350 to 500° C. A resin for which glass transition temperature is not substantially observed (for example, for a measurement range of 400° C. or lower) can also be preferably used in the present invention.

Examples of resins having Tg of 250° C. or hither include polyimide resins (e.g., Kapton (trade name, DuPont, 400° C. or higher)), Upilex-R (trade name, Ube Industries, 285° C.), upilex-S (trade name, Ube Industries, 400° C. or higher)), fluorinated polyimide resins (e.g., Flupi-01 (trade name, NTT, 335° C.)), acryloyl resins (the compound of Japanese Patent Laid-open Publication No. 2002-80616, Example 1, 300° C. or higher) and so forth (the temperatures indicated in the parentheses represent Tg).

Among the aforementioned resins, those having a high Tg or substantially colorless and transparent are preferred. Specifically, polyimide resins (e.g., Kapton (trade name, DuPont, 400° C. or higher)), Upilex-R (trade name, Ube Industries, 285° C.), Upilex-S (trade name, Ube Industries, 400° C. or higher)), fluorinated polyimide resins (e.g., Flupi-01 (trade name, NTT, 335° C.)), acryloyl resins (the compound of Japanese Patent Laid-open Publication No. 2002-80616, Example 1, 300° C. or higher) and so forth can be preferably used (the temperatures indicated in the parentheses represent Tg).

Further, particularly preferred examples of the resin having Tg of 250° C. or higher used for the aforementioned base material also include resins having a spiro structure represented by the following formula (1) and resins having a cardo structure represented by the following formula (2). These polymers are compounds having high heat resistance, high elasticity and high tensile fracture strength, and further having superior optical transparency and optical isotropy, and thus they are suitable as substrate materials of organic EL devices and so forth, which must be subjected to various heating operations in the production processes, and are required to have a performance of being unlikely to be broken even when they are flexed.

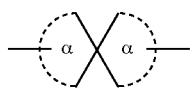

Formula (1)

In the formula (1), the rings α represent a monocyclic or polycyclic ring, and two of the rings are bound via a spiro bond.

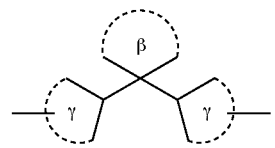

Formula (2)

In the formula (2), the ring β and the rings γ represent a monocyclic or polycyclic ring, and two of the rings γ may be identical or different and bond to one quaternary carbon atom in the ring β.

Preferred examples of the resins having a spiro structure represented by the formula (1) include polymers containing a spirobiindane structure represented by the following formula (3) in repeating units, polymers containing a spirobichroman structure represented by the following formula (4) in repeating units, and polymers containing a spirobibenzofuran structure represented by the following formula (5) in repeating units.

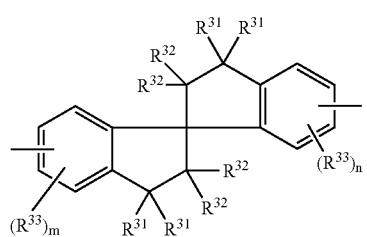

Formula (3)

In the formula (3), $R^{31}$, $R^{32}$ and $R^{33}$ each independently represent hydrogen atom or a substituent. Groups of each type may bond to each other to form a ring. m and n represent an integer of 1 to 3. Preferred examples of the substituent include a halogen atom, an alkyl group and an aryl group. More preferred examples of, $R^{31}$ and $R^{32}$ are hydrogen atom, methyl group and phenyl group, and more preferred examples of $R^{33}$ are hydrogen atom, chlorine atom, bromine atom, methyl group, isopropyl group, t-butyl group and phenyl group.

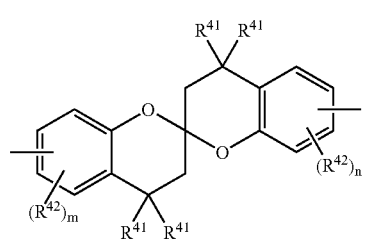

Formula (4)

In the formula (4), $R^{41}$ and $R^{42}$ each independently represent hydrogen atom or a substituent. Groups of each type may bond to each other to form a ring. m and n represent an integer of 1 to 3. Preferred examples of the substituent include a halogen atom, an alkyl group and an aryl group. More preferred examples of $R^{41}$ are hydrogen atom, methyl group and phenyl group, and more preferred examples of $R^{42}$ are hydrogen atom, chlorine atom, bromine atom, methyl group, isopropyl group, t-butyl group and phenyl group.

Formula (5)

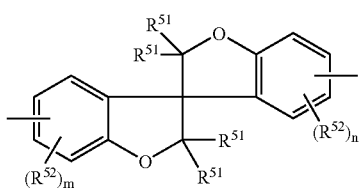

In the formula (5), $R^{51}$ and $R^{52}$ each independently represent hydrogen atom or a substituent. Groups of each type may bond to each other to form a ring. m and n represent an integer of 1 to 3. Preferred examples of the substituent include a halogen atom, an alkyl group and an aryl group. More preferred examples of $R^{51}$ are hydrogen atom, methyl group and phenyl group, and more preferred examples of $R^{52}$ are hydrogen atom, chlorine atom, bromine atom, methyl group, isopropyl group, t-butyl group and phenyl group.

Preferred examples of the resins having a cardo structure represented by the formula (2) include polymers containing a fluorene structure represented by the following formula (6) in repeating units.

Formula (6)

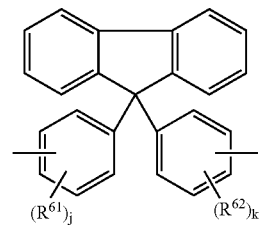

In the formula (6), $R^{61}$ and $R^{62}$ each independently represent hydrogen atom or a substituent. Groups of each type may bond to each other to form a ring. j and k represent an integer of 1 to 4. Preferred examples of the substituent include a halogen atom, an alkyl group and an aryl group. More preferred examples of $R^{61}$ and $R^{62}$ are hydrogen atom, chlorine atom, bromine atom, methyl group, isopropyl group, t-butyl group and phenyl group.

The polymers containing a structure represented by any one of the formulas (3) to (6) in repeating units may be polymers formed with various bonding schemes such as polycarbonates, polyesters, polyamides, polyimides and polyurethanes. The polymers containing a structure represented by any one of the formulas (3) to (6) are preferably polycarbonates derived from bisphenol compounds, polyesters or polyurethanes in view of optical transparency. Among these, aromatic polyesters are particularly preferred in view of heat-resistance.

Preferred specific examples of the polymers having a structure represented by the formula (1) or formula (2) are shown below. However, the present invention is not limited to these.

I-1

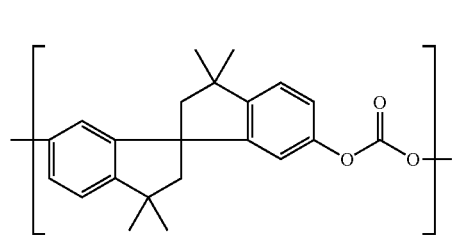

I-2

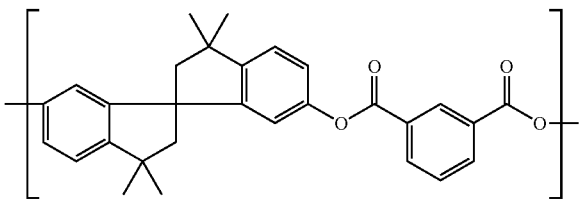

I-3

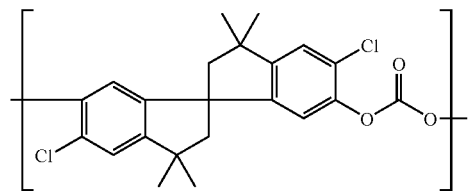

I-4

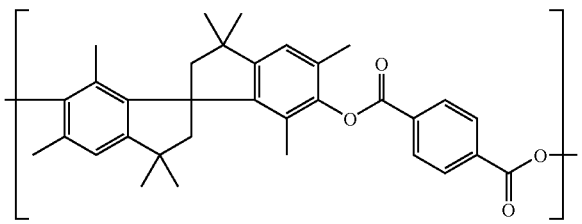

-continued
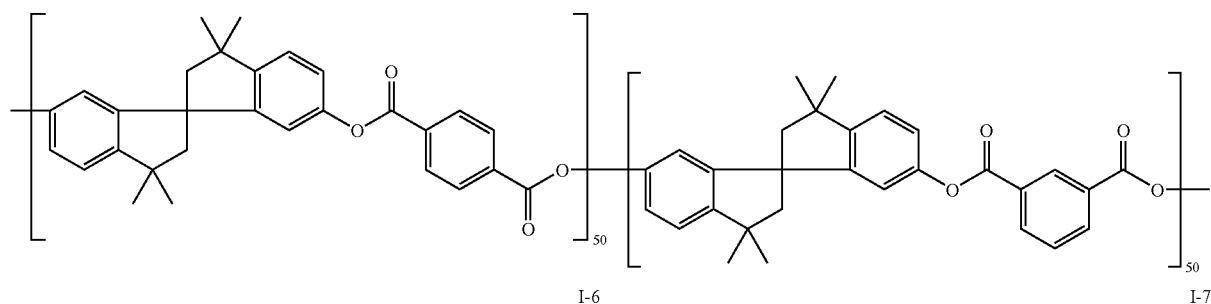
I-5
I-6
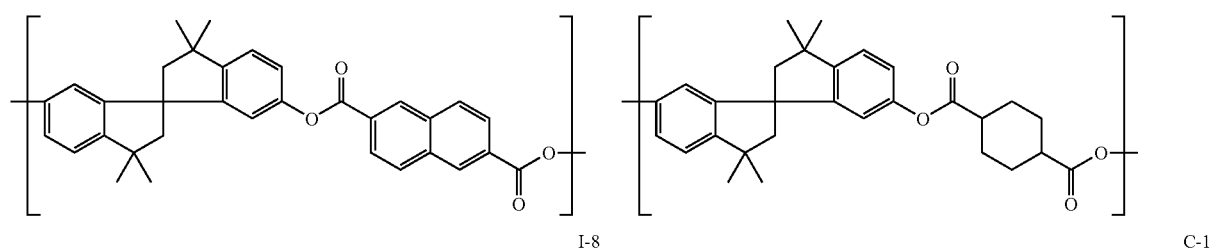
I-7
I-8
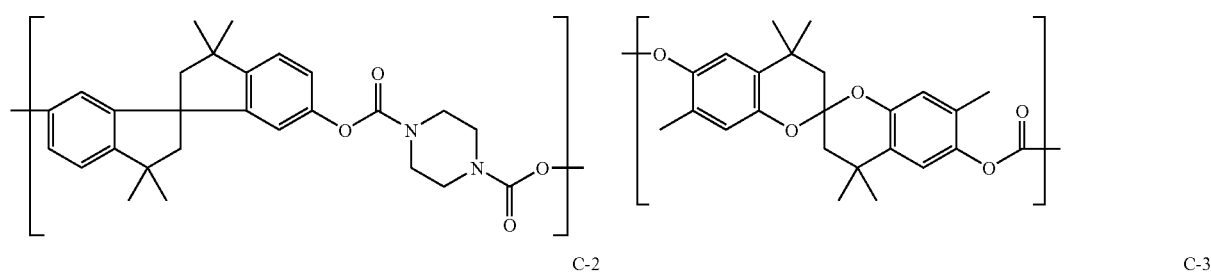
C-1
C-2
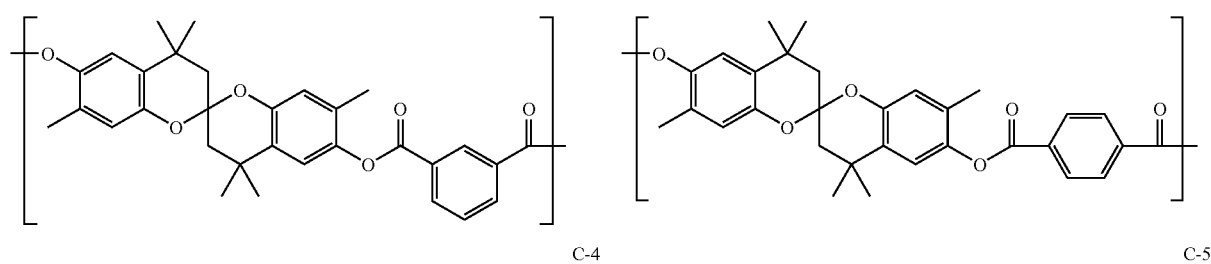
C-3
C-4
Copolymer of C-2 and C-3 (50/50 mol %)
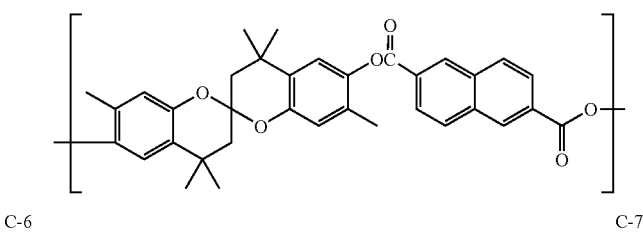
C-5
C-6
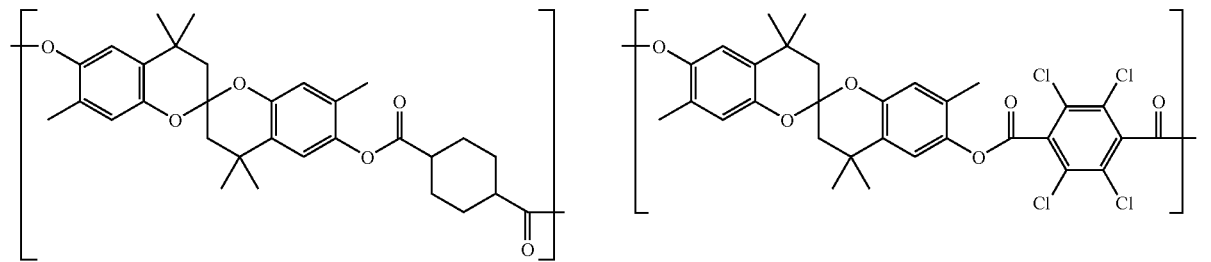
C-7

-continued
C-8
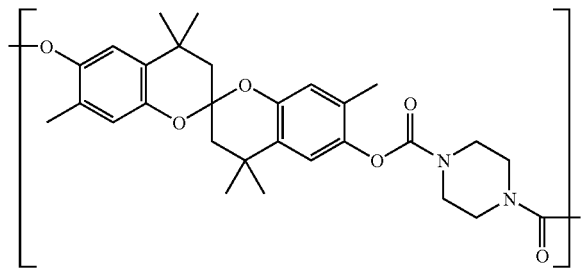
F-1
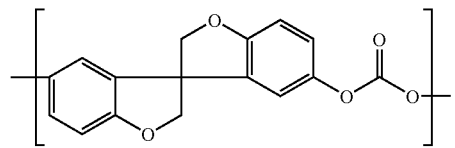
F-2
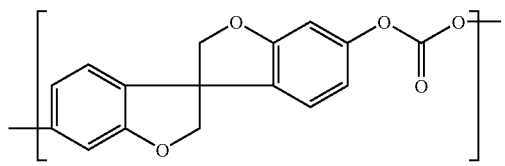
F-3
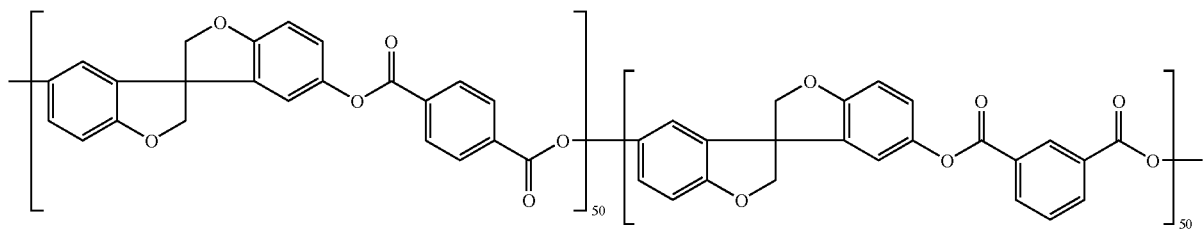
F-4
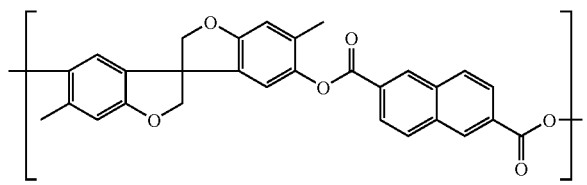
F-5
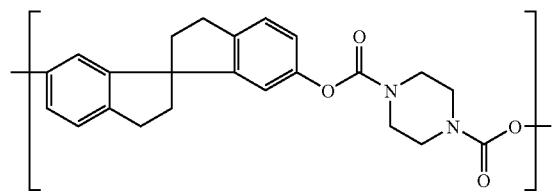
H-1
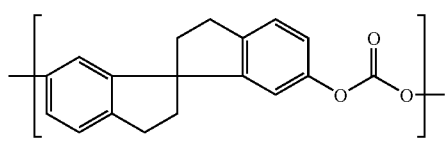
H-2
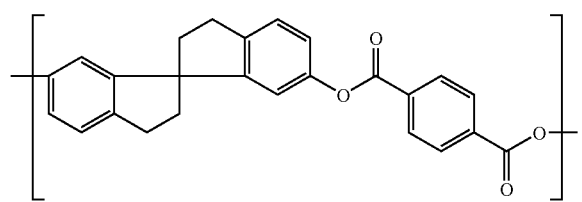
H-3
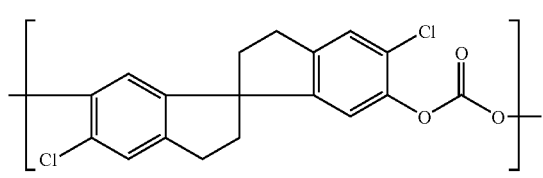
H-4
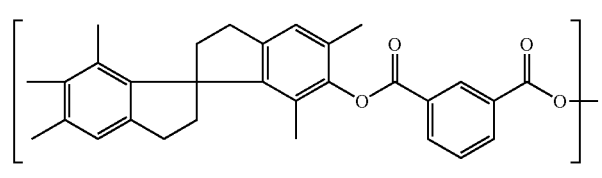
H-5
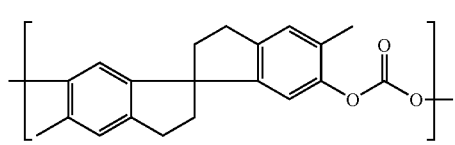
H-7
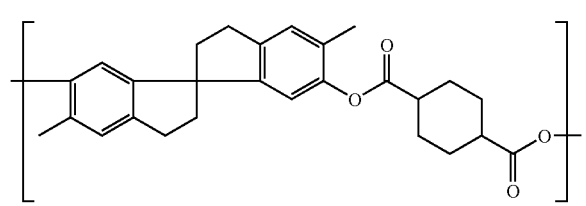

-continued
H-8
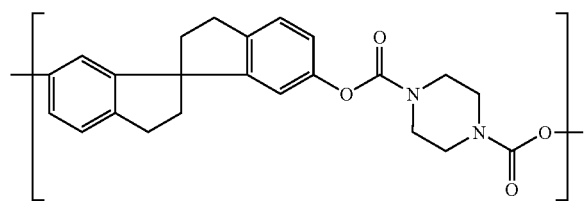
FL-1
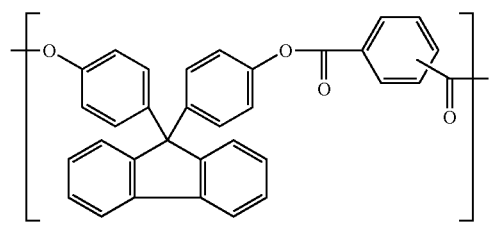
(Isophthaloyl/terephthaloyl copolymer, 50/50 mol %)
FL-2
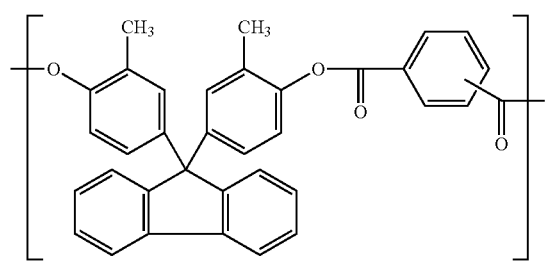
(Isophthaloyl/terephthaloyl copolymer, 50/50 mol %)
FL-3
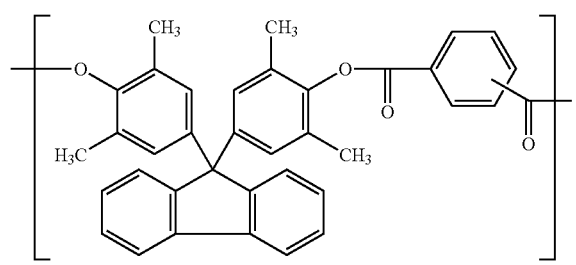
(Isophthaloyl/terephthaloyl copolymer, 50/50 mol %)
FL-4
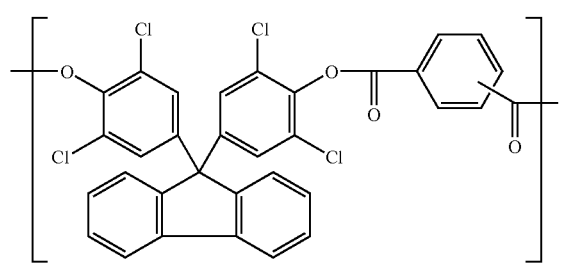
(Isophthaloyl/terephthaloyl copolymer, 50/50 mol %)
FL-5
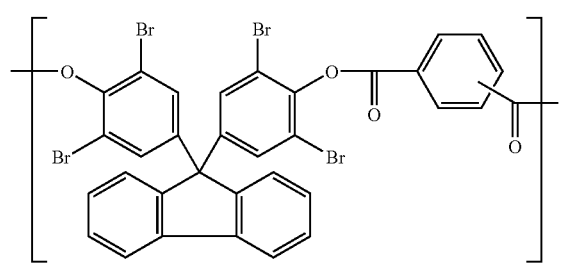
(Isophthaloyl/terephthaloyl copolymer, 50/50 mol %)
FL-6
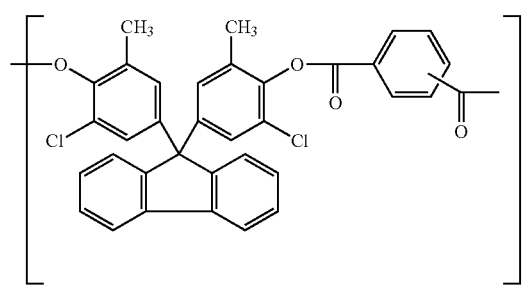
FL-7
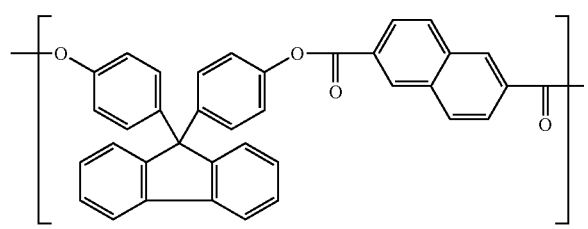
FL-8
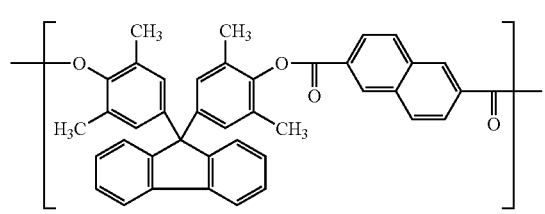
FL-9
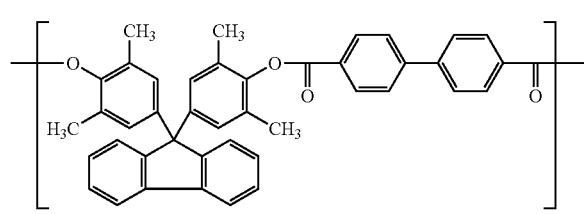

Copolymer of FL-8 and FL-9 (80/20 mol %)　　FL-10

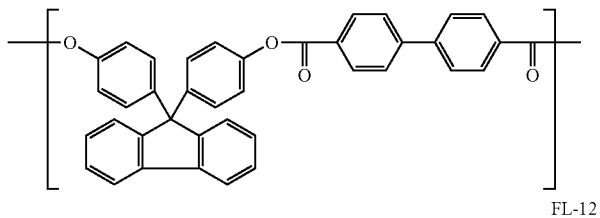

FL-11

Copolymer of FL-7 and FL-11 (80/20 mol %)　　FL-12

The polymers having a structure represented by the formula (1) or formula (2) used in the present invention may be used independently, and may be used as a mixture of two or more kinds of them. Moreover, they may be homopolymers or copolymers consisting of a combination of two or more kinds of the structures. When a copolymer is used, a known repeating unit not containing a structure represented by the formula (1) or (2) in the repeating unit may be copolymerized within such a degree that the advantages of the present invention should not be degraded. Copolymers more often have improved solubility and transparency compared with homopolymers, and such copolymers can be preferably used.

The polymers having a structure represented by the formula (1) or formula (2) used for the present invention preferably has a molecular weight of 10,000 to 500,000, more preferably 20,000 to 300,000, particularly preferably 30,000 to 200,000, in terms of weight average molecular weight. If the molecular weight is 10,000 or more, fabrication of the film becomes easier. On the other hand, if the molecular weight is 500,000 or less, it is easier to control the molecular weight during the synthesis, and handling becomes easier because of low viscosity of solution. The molecular weight may be determined on the basis of corresponding viscosity.

In the present invention, as the resin used for the base material, curable resins (crosslinked resins) may be also preferably used so long as they have Tg of 250° C. or higher, which have superior solvent resistance and heat resistance, in addition to the aforementioned thermoplastic resins. As for the types of the curable resins, both of thermosetting resins and radiation-curable resins can be used, and those of known types can be used without particular limitations. Examples of the thermosetting resins include phenol resins, urea resins, melamine resins, unsaturated polyester resins, epoxy resins, silicone resins, diallyl phthalate resins, furan resins, bismaleimide resins, cyanate resins and so forth.

As for the method for crosslinking the aforementioned curable resins, any reactions that form a covalent bond may be used without any particular limitation, and systems in which the reactions proceed at room temperature, such as those utilizing a polyhydric alcohol compound and a polyisocyanate compound to form urethane bonds can also be used without any particular limitation. However, such systems often have a problem concerning the pot life before the film formation, and therefore such systems are usually used as two-pack systems, in which, for example, a polyisocyanate compound is added immediately before the film formation. On the other hand, if a one-pack system is used, it is effective to protect functional groups to be involved in the crosslinking reaction, and such systems are marketed as blocked type curing agents.

Known as the marketed blocked type curing agents are B-882N produced by Mitsui Takeda Chemicals, Inc., Coronate 2513 produced by NIPPON POLYURETHANE INDUSTRY CO., LTD. (these are blocked polyisocyanates), Cymel 303 produced by Mitsui-Cytec Ltd. (methylated melamine resin) and so forth. Moreover, blocked carboxylic acids, which are protected polycarboxylic acids usable as curing agents of epoxy resins, such as B-1 mentioned below are also known.

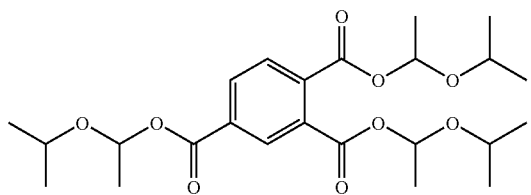

B-1

The radiation curable resins are roughly classified into radical curable resins and cationic curable resins. As a curable component of the radical curable resins, a compound having two or more radically polymerizable groups in the molecule is used, and as typical examples, compounds having 2 to 6 acrylic acid ester groups in the molecule called polyfunctional acrylate monomers, and compounds having two or more acrylic acid ester groups in the molecule called urethane acrylates, polyester acrylates, and epoxy acrylates are used.

Typical examples of the method for curing radical curable resins include a method of irradiating an electron ray and a method of irradiating an ultraviolet ray. In the method of irradiating an ultraviolet ray, a polymerization initiator that generates a radical by ultraviolet irradiation is usually added. If a polymerization initiator that generates a radical by heating is added, the resins can also be used as thermosetting resins.

As a curable component of the cationic curable resins, a compound having two or more cationic polymerizable groups in the molecule is used. Typical examples of the curing method include a method of adding a photoacid generator that generates an acid by irradiation of an ultraviolet ray and irradiating an ultraviolet ray to attain curing. Examples of the cationic polymerizable compound include compounds containing a ring opening-polymerizable group such as epoxy group and compounds containing a vinyl ether group.

For the resin base material used for the present invention, a mixture of two or more kinds of resins selected from each type of the aforementioned thermosetting resins and radiation curable resins may be used, and a thermosetting resin and a radiation curable resin may be used together. Further, a mixture of a curable resin (crosslinkable resin) and a resin not having a crosslinkable group may also be used.

The aforementioned curable resin (crosslinkable resin) is preferably mixed in the base material used in the present invention, because solvent resistance heat resistance, optical characteristics, and toughness of the base material can be thereby obtained. Moreover, it is also possible to introduce crosslinkable groups into a resin used for the base material, and such a resin may have the crosslinkable group at any of end of polymer main chain, positions in polymer side chain and polymer main chain. When such a resin is used, the base material may be prepared without using the aforementioned commonly used crosslinkable resin together.

When the gas barrier film of the present invention is used for liquid crystal displays and so forth, it is preferable to use an amorphous polymer as the resin in order to attain optical uniformity. Furthermore, for the purpose of controlling retardation (Re) and wavelength dispersion thereof, resins having positive and negative intrinsic birefringences may be combined, or a resin showing a larger (or smaller) wavelength dispersion may be combined.

In the present invention, a laminate of different resins may be preferably used as the aforementioned resin base material in order to control retardation (Re) or improve gas permeability and dynamic characteristics. No particular limitation is imposed on preferred combinations of different resins, and any combinations of the aforementioned resins can be used.

The resin base material used in the present invention may be stretched. Stretching provides advantages of improvement of mechanical strengths of the film such as anti-folding strength, and thus improvement of handling property of the film. In particular, a film having an orientation release stress (ASTM D1504, henceforth abbreviated as "ORS") of 0.3 to 3 GPa along the stretching direction is preferred, because mechanical strength of such a film is improved. ORS is internal stress present in a stretched film or sheet generated by stretching.

Known methods can be used for the stretching method, and the stretching can be performed by, for example, the roller monoaxial stretching method, tenter monoaxial stretching method, simultaneous biaxial stretching method, sequential biaxial stretching method, or inflation method at a temperature of from a temperature higher than the glass transition temperature (Tg) of the resin by 10° C. to a temperature higher than Tg by 50° C. The stretching ratio is preferably 1.1 to 3.5 times.

Although the thickness of the resin base material used in the present invention is not particularly limited, it is preferably 30 to 700 μm. more preferably 40 to 200 μm, still more preferably 50 to 150 μm. The haze of the base material is preferably 3% or less, more preferably 2% or less, still more preferably 1% or less. Further, the total light transmission of the base material is preferably 70% or more, more preferably 80% or more, still more preferably 90% or more.

The resin base material used in the present invention may be further added with resin property modifiers such as plasticizers, dyes and pigments, antistatic agents, ultraviolet absorbers, antioxidants, inorganic microparticles, release accelerators, leveling agents, inorganic layered silicate compounds and lubricants as required in such a degree that the advantages of the present invention are not degraded.

<Inorganic Layer>

In the present invention, type and film formation method of the inorganic layer are not particularly limited, and known inorganic layers and film formation methods therefor can be used. The inorganic layer includes an inorganic oxide layer and a transparent conductive layer. Although the film formation method of the inorganic layer may be any method so long as a desired thin film can be formed, the sputtering method, vacuum deposition method, ion plating method, plasma CVD method and so forth are preferred. The film formation can be attained by, for example, the methods described in Japanese Patent No. 3400324, Japanese Patent Laid-open Publication Nos. 2002-322561 and 2002-361774.

Although the components constituting the inorganic layer are not particularly limited, for example, oxides, nitrides, oxynitrides etc. containing one or more kinds of elements selected from Si, Al, In, Sn, Zn, Ti, Cu, Ce, Ta and so forth can be used. The thickness of the inorganic layer is not also particularly limited. The thickness of one inorganic layer is preferably in the range of 5 to 1000 nm, more preferably 10 to 1000 nm, particularly preferably 10 to 200 nm. When it is in the range of 5 to 1000 nm, generation of cracks due to bending stress can be avoided and the film can be uniformly distributed without generation of a dot pattern whereby water vapor barrier property is improved.

Further, when two or more inorganic layers are contained, they may have the same composition or different compositions, and they are not particularly limited. In order to obtain both of water vapor barrier property and high transparency, it is preferable to use silicon oxide or silicon oxynitride in the composition of the inorganic layer. Silicon oxide is represented as $SiO_x$. For example, when $SiO_x$ is used for the inorganic substance layer, x is desirably more than 1.6 and less then 1.9 ($1.6<x<1.9$) in order to obtain both of favorable water vapor barrier property and high light transmission. Silicon oxynitride is represented as $SiO_xN_y$. As for the ratio of x and y, when improvement of adhesion property is emphasized, an oxygen rich film is preferred, and thus it is preferred that x is more than 1 and less than 2, and y is more than 0 and less than 1 ($1<x<2, 0<y<1$). When improvement of water vapor barrier property is emphasized, a nitrogen rich film is preferred, and thus it is preferred that x is more than 0 and less than 0.8, and y is more than 0.8 and less than 1.3 ($0<x<0.8, 0.8<y<1.3$).

<Organic Layer>

In the gas barrier film of the present invention, the organic layer is provided as a layer adjacent to the inorganic layer for the purpose of increasing the gas barrier property of the inorganic layer.

The "organic layer" referred to in this specification means a layer having a function of compensating defects of the inorganic layer (defect-compensating layer), and it includes an inorganic oxide layer and organic/inorganic hybrid layer formed by a sol-gel method.

In the present invention, although the method for forming the organic layer is not particularly limited so long as a layer that can function as a defect-compensating layer can be formed, (1) a method of utilizing an inorganic oxide layer prepared by using a sol-gel method, and (2) a method of coating or vapor-depositing an organic substance to form a layer and then curing the layer with an ultraviolet ray or electron beam can be preferably used. Further, methods of (1) and (2) can be used in combination for the formation of the organic layer. For example, it is possible to form an organic layer on a base material film by the method of (1), then form an inorganic layer and thereafter form an organic layer by the method of (2).

(1) Method of Utilizing an Inorganic Oxide Layer Prepared by using a sol-gel method In the sol-gel method used in the present invention, a metal alkoxide is hydrolyzed and polycondensed preferably in a solution or coated film to obtain a dense thin film. Further, in this operation, a resin may also be used together to obtain an organic/inorganic hybrid material.

The "organic/inorganic hybrid" referred to in this specification means a state that inorganic materials and or ganic materials are mixed at a molecular level and nano-order level, and refers to, for example, composite materials of an organic material and inorganic material obtained by the sol-gel methods described in Adv. Polym. Sci., 100, 11 (1992); Poly. Mater. Encyclopedia, 6, 4793 (1996); and Current opinion in Solid State & Materials Science, 1, 806 (1996).

As the metal alkoxide used in the sol-gel method, alkoxysilanes and metal alkoxides other than alkoxysilane can be used. As the metal alkoxides other than alkoxysilane, zirconium alkoxides, titanium alkoxides, aluminum alkoxides and so forth are preferred.

Alkoxysilanes preferably used in the present invention will be further explained.

Examples of tetrafunctional alkoxysilanes include tetramethoxysilane, tetraethoxysilane, tetra-n-propoxysilane, tetraisopropoxysilane, tetra-n-butoxysilane, tetraacetoxysilane and so forth.

Examples of trifunctional alkoxysilanes include methyltrimethoxysilane, methyltriethoxysilane, ethyltrimethoxysilane, ethyltriethoxysilane, n-propyltrimethoxysilane, n-propyltriethoxysiiane, isopropyltrimethoxysilane, isopropyltriethoxysilane, γ-chloropropyltrimethoxysilane, γ-chloropropyltriethoxysilane, γ-glycidoxypropyltrimethoxysilane, γ-glycidoxypropyltriethoxysilane, γ-methacryloyloxypropyltrimethoxysilane, γ-mercaptopropyltriethoxysilane, phenyltrimethoxysilane, vinyltriethoxysilane, 3,4-epoxycyclohexylethyltrimethoxysilane, 3,4-epoxycyclohexylethyltriethoxysilane and so forth.

Examples of bifunctional alkoxysilanes include dimethyldimethoxysilane, dimethyldiethoxysilane, methylphenyldimethoxysilane, diethyldimethoxysilane, diethyldiethoxysilane, di-n-propyldimethoxysilane, di-n-propyldiethoxysilane, diisopropyldimethoxysilane, diisopropyldiethoxysilane, diphenyldimethoxysilane, divinyldiethoxysilane and so forth.

The polymer used in combination for the sol-gel reaction preferably has a hydrogen bond-forming group. Examples of resins having a hydrogen bond-forming group include polymers having hydroxyl group and derivatives thereof (polyvinyl alcohol, polyvinyl acetal, ethylene-vinyl alcohol copolymer, phenol resin, methylol melamine etc. and derivatives thereof); polymers having carboxyl group and derivatives thereof (homopolymers or copolymers containing units of a polymerizable unsaturated acid such as poly(meth)acrylic acid, maleic anhydride and itaconic acid, esters of these polymers (homopolymers or copolymers containing units of a vinyl ester such as vinyl acetate, (meth)acrylic acid ester such as methyl methacrylate or the like) etc.); polymers having an ether bond (polyalkylene oxide, polyoxyalkylene glycol, polyvinyl ether, silicon resin etc.); polymers having an amide bond (N-acylated polyoxazoline and polyalkyleneimine having a >N(COR)— bond (in the formula, R represents hydrogen atom, an alkyl group which may be substituted or an aryl group which may be substituted)); polyvinylpyrrolidine having a >NC(O)— bond and derivatives thereof; polyurethane having a urethane bond; polymers having a urea bond and so forth. Further, a polymer containing silyl groups may also be used. Preferred as the polymer containing silyl groups are those comprising a vinyl polymer as a main chain.

The content of the polymer containing silyl groups in the sol-gel reaction composition (sol-gel solution) is 1 to 200% by weight, preferably 3 to 100% by weight, more preferably 5 to 50% by weight, based on the total alkoxysilane used. Further, monomers may be used together in the sol-gel reaction and polymerized during the sol-gel reaction or thereafter to produce an organic/inorganic hybrid material.

During the sol-gel reaction, the metal alkoxide is hydrolyzed and polymerized by condensation in water or an organic solvent. For this reaction, it is preferable to use a catalyst. As the catalyst for hydrolysis, acids are generally used. As the acids, inorganic acids or organic acids may be used. Examples of the inorganic acids include hydrochloric acid, hydrogen bromide, hydrogen iodide, sulfuric acid, sulfurous acid, nitric acid, nitrous acid, phosphoric acid, phosphorous acid and so forth. Examples of the organic acids include carboxylic acids (formic acid, acetic acid, propionic acid, butyric acid, succinic acid, cyclohexanecarboxylic acid, octanoic acid, maleic acid, 2-chloropropionic acid, cyanoacetic acid, trifluoroacetic acid, perfluorooctanoic acid, benzoic acid, pentafluorobenzoic acid, phthalic acid etc.), sulfonic acids (methanesulfonic acid, ethanesulfonic acid, trifluoromethanesulfonic acid, p-toluenesulfonic acid, pentafluorobenzenesulfonic acid etc.), phosphoric acids and phosphonic acids (phosphoric acid dimethyl ester, phenylphosphonic acid etc.), Lewis acids (boron trifluoride etherate, scandium triflate, alkyltitanic acid, aluminic acid etc.) and heteropolyacids (phosphomolybdic acid, phosphotungstic acid etc.).

The amount of the acid used is 0.0001 to 0.05 mol, preferably 0.001 to 0.01 mol, per 1 mol of metal alkoxide (aikoxysilane+other metal alkoxide when alkoxysilane and other metal alkoxide are contained).

After the hydrolysis, a basic compound such as inorganic bases and amines may be added to adjust pH of the solution to make it close to neutral so that condensation polymerization should be promoted. As the inorganic bases, sodium hydroxide, potassium hydroxide, calcium hydroxide, magnesium hydroxide, aluminum hydroxide, ammonia and so forth can be used. As the organic base compounds, amines (ethylenediamine, diethylenetriamine, triethylenetetramine, tetraethylenepentamine, triethylamine, dibutylamine, N,N-dimethylbenzylamine, tetramethylethylenediamine, piperidine, piperazine, morpholine, ethanolamine, diazabicycloundecene, quinuclidine, aniline, pyridine etc.) and phosphines (triphenylphosphine, trimethylphosphine etc.) can be used.

Further, it is also preferable to use, after the hydrolysis with acids, in particular, the amines described in Japanese Patent Application No. 2002-110061. In such a case, the amines are suitably added in an amount of 1 to 100 moles, preferably 1 to 20 moles, per 1 mole of the acid.

Further, other sol-gel catalysts, for example, metal chelate compounds having Al, Ti or Zr as a center metal, organic metal compounds such as tin compounds, metal salts such as alkali metal salts of organic acids and so forth can also be used in combination.

The content of the sol-gel catalyst compound in the sol-gel reaction composition is 0.01 to 50% by weight, preferably 0.1 to 50% by weight, more preferably 0.5 to 10% by weight, based on the alkoxysilane as a raw material of the sol solution.

Solvents used in the sol-gel reaction will be explained below. The solvents allow all ingredients in the sol solution to be uniformly mixed, thereby make it possible to prepare solid matter in the composition of the present invention and use various coating methods, and improve dispersion stability and storage stability of the composition. These solvents are not particularly limited so long as they can achieve the aforementioned objects. Preferred examples of the solvents include, for example, water and organic solvents showing high water-miscibility.

Examples thereof include tetrahydrofuran, dimethoxyethane, formic acid, acetic acid, methyl acetate, alcohols (methanol, ethanol, n-propyl alcohol, isopropyl alcohol, tert-butyl alcohol), ethylene glycol, diethylene glycol, triethylene glycol, ethylene glycol monobutyl ether, acetic acid ethylene glycol monoethyl ether, acetone, N,N-dimethylformamide, N,N-dimethylacetamide, dimethyl sulfoxide and so forth.

In order to adjust the sol-gel reaction rate, organic compounds that can constitute multidentate ligands may be added to stabilize the metal alkoxide. Examples thereof include β-diketones and/or β-ketoesters and alkanolamines. Specific examples of the β-diketones and/or β-ketoesters include acetylacetone, methyl acetoacetate, ethyl acetoacetate, n-propyl acetoacetate, isopropyl acetoacetate, n-butyl acetoacetate, sec-butyl acetoacetate, tert-butyl acetoacetate, 2,4-hexanedione, 2,4-heptanedione, 3,5-heptanedione, 2,4-octanedione, 2,4-nonanedione, 5-methylhexanedione and so forth. Among these, ethyl acetoacetate and acetylacetone are preferred, and acetylacetone is particularly preferred. One kind of these β-diketones and/or β-ketoesters can solely be-used, or two or more kinds of these can be used as a mixture.

When the aforementioned metal chelate compounds are used as sol-gel catalysts, these compounds that can be multidentate ligands can also be used to adjust the reaction rate.

A method for coating a sol-gel reaction composition will be described below. A sol solution can be used to form a thin film on a transparent film by using a coating method such as curtain flow coating, dip coating, spin coating or roller coating. In this case, the timing of hydrolysis may be at any time during the production process. For example, there can be suitably used a method in which a solution having a required composition is hydrolyzed and partially condensed to prepare a desired sol solution beforehand, and then it is applied and dried, a method in which a solution having a required composition is prepared, applied and dried while being simultaneously hydrolyzed and partially condensed, a method in which, after a solution is coated and primarily dried, a water-containing solution necessary for hydrolysis is overlaid to attain the hydrolysis, and so forth. Further, various application methods can be used. When productivity is emphasized, a method in which the discharge flow rates of a lower layer coating solution and an upper layer coating solution are adjusted in a slide geeser having multiple discharge ports so that requited coating amounts of the solutions should be obtained, and the formed multilayer flows are continuously placed on a support and dried (simultaneous multilayer coating method) is preferably used.

The temperature for drying after the coating of the sol-gel reaction composition is 150 to 350° C., preferably 150 to 250° C., more preferably 150 to 200° C. If the drying temperature after the coating is 150 to 350° C., a denser film can be prepared, and interactions with inorganic oxide interface can be promoted to improve the gas barrier ability.

In order to make the gas barrier film further denser after the coating and drying, an energy beam may be irradiated on the organic layer. Although type of the irradiation beam is not particularly limited, irradiation of ultraviolet rays, electron beams or microwaves can be preferably used in view of influence on deformation and degeneration of the base material. The irradiation intensity is 30 to 500 mJ/cm$^2$, preferably 50 to 400 mJ/cm$^2$. The irradiation temperature may be selected from the range of from room temperature to the temperature at which the substrate begins to deform without any particular limitation, and it is preferably 30 to 150° C., more preferably 50 to 130° C.

(2) Method of Coating or Vapor-depositing an Organic substance to form a layer and then curing the layer with an ultraviolet ray or electron beam Hereafter, use of an organic layer formed with a polymer obtained by crosslinking monomers as a main component will be explained.

Although the monomers are not particularly limited so long as they have a group that can be crosslinked with an ultraviolet ray or electron beam, monomers having an acryloyl group, methacryloyl group or oxetane group are preferably used. As for such monomers, it is preferable to use, as a main component, for example, polymers obtained by polymerizing monomers of bifunctionality or higher functionality having acryloyl group or methacryloyl group such as epoxy (meth)acrylate, urethane (meth)acrylate, (meth) acrylic isocyanurate, pentaerythritol (meth)acrylate, trimethylolpropane (meth)acrylate, ethylene glycol (meth)acrylate, and polyester (meth)acrylate. A mixture of two or more kinds of these monomers of bifunctionality or higher functionality having acryloyl group or methacryloyl group may be used, or a monofunctional (meth)acrylate may be mixed and used. As for the monomers having oxetane group, those having the structures represented by the formulas (3) to (6) mentioned in Japanese Patent Laid-open Publication No. 2002-356607 are preferably used. Arbitrary mixtures of these monomers may also be used.

It is further preferable to use acrylic isocyanurate, epoxy acrylate or urethane acrylate, which has a particularly high crosslinking degree and Tg of 250° C. or higher, as a main component in view of heat resistance and solvent resistance required for use in displays.

In the present invention, although the thickness of one organic layer is not particularly limited, it is preferably in the range of 10 nm to 5 μm, more preferably 10 nm to 2 μm, still more preferably 200 nm to 2 μm. If the thickness of the organic layer is in the range of 10 nm to 5 μm, it becomes easy to obtain uniformity of the thickness because structural defects of the inorganic layer are efficiently filled with the organic layer. Furthermore, generation of cracks in the organic layer by an external force such as bending forth can be avoided and improvement in barrier property is obtained.

Examples of the method of forming the organic layer in the present invention include an application method, vacuum film formation method and so forth. Although the vacuum film formation method is not particularly limited, vapor deposition, plasma CVD and so forth are preferred, and the resistance heating vapor deposition method is more preferred, in which film formation rate of organic monomers is easily controlled. Although the method of crosslinking the organic monomers of the present invention is not limited at all, crosslinking by means of an electron ray, ultraviolet ray or the like is desirable for the reasons that equipment for it is easily disposed in a vacuum chamber, and it rapidly provides a higher molecular weight by the crosslinking reactions. When the organic layer is formed by an application method, conventionally used various application methods such as spray coating, spin coating and bar coating can be used.

<Functional Layer>

The gas barrier film of the present invention can further have any of the following various functional layers in addition to the aforementioned inorganic layer and organic layer.

(Transparent Conductive Layer)

As a transparent conductive layer, known metal films and metal oxide films can be used. Metal oxide films are particularly preferred in view of transparency, conductivity and mechanical characteristics. Examples include, for example, metal oxide films such as those of indium oxide, cadmium oxide, and tin oxide added with tin, tellurium, cadmium, molybdenum, tungsten, fluorine or the like as impurities, zinc oxide, titanium oxide and so forth added with aluminum as impurities. In particular, thin films of indium oxide containing 2 to 15 weight % of tin oxide (ITO) have superior transparency and conductivity, and therefore they are preferably used. Examples of the method of forming the transparent conductive layer include the vacuum deposition method, sputtering method, ion beam sputtering method and so forth.

The film thickness of the transparent conductive layer is preferably in the range of 15 to 300 nm. If the film thickness of the transparent conductive layer is 15 to 300 nm, the film becomes a continuous film, and sufficient conductivity, transparency and flexibility can be obtained.

When the transparent conductive layer is provided as an outermost layer, it may be provided either on the base material side or the gas barrier coat layer side. However, it is preferably provided on the gas barrier coat layer side in view of prevention of invasion of moisture contained in the base material in a small amount.

(Primer Layer)

In the gas barrier film of the present invention, a known primer layer or inorganic thin film layer can be provided between the base material and the inorganic layer and organic layer (gas barrier layer). Although acrylic resins, epoxy resins, urethane resins, silicone resins and so forth, for example, can be used as the primer layer, it is preferable in the present invention to use an organic/inorganic hybrid layer as the primer layer or an inorganic vapor-deposited layer or dense inorganic coated thin film prepared by the sol/gel method as the inorganic thin film layer. As the inorganic vapor-deposited layer, vapor-deposited layers of silica, zirconia, alumina and so forth are preferred. The inorganic vapor-deposited layer can be formed by the vacuum deposition method, sputtering method or the like.

(Other Functional Layers)

On the organic layer and the inorganic layer (gas barrier coat layer), or as an outermost layer, various known functional layers may be provided as required. Examples of the functional layers include optically functional layers such as anti-reflection layer, polarization layer, color filter, ultraviolet absorbing layer and light extraction efficiency improving layer, dynamically functional layers such as hard coat layer and stress relaxation layer, electrically functional layers such as antistatic layer and conductive layer, antifogging layer, antifouling layer, printable layer and so forth.

In the gas barrier film of the present invention, either the aforementioned inorganic layer or organic layer may be laminated or formed first. In view of adhesion to the base material, it is preferred that the inorganic layer and the organic layer should be laminated on the base material in this order. Further, it is preferable to further alternately laminate one or more inorganic layers and one or more organic layers on the aforementioned inorganic layer or organic layer, because the gas barrier performance is thereby increased.

In this specification, the concept meant by the expression "alternately comprising at least one inorganic layer and at least one organic layer" also includes a two-layer structure comprising one inorganic layer and one organic layer.

The gas barrier film of the present invention suitably has an oxygen permeability of 0 to 0.02 mL/m$^2$·day·atm, preferably 0 to 0.01 mL/m$^2$·day·atm, more preferably 0 to 0.005 mL/m$^2$·day·atm, at 23° C. and 90% of relative humidity. If the oxygen permeability is 0.02 mL/m$^2$·day·atm or less at 23° C. and 90% of relative humidity, when the gas barrier film is used in, for example, an organic EL device or LCD, degradation of the EL device can be substantially avoided, and therefore such an oxygen permeability is preferred.

Further, the gas barrier film of the present invention suitably has a water vapor permeability of 0 to 0.02 g/m$^2$·day, preferably 0 to 0.01 g/m$^2$·day, more preferably 0 to 0.005 g/m$^2$·day, at 23° C. and 100% of relative humidity.

[Image Display Device]

Although the use of the gas barrier film of the present invention is not particularly limited, it can be suitably used as a transparent electrode substrate of image display device because of its superior gas barrier performance. The "image display device" referred to herein means a circularly polarizing plate, liquid crystal display device, touch panel, organic EL device or the like. It is particularly preferably used as a substrate of an organic EL device.

<Circularly Polarizing Plate>

A λ/4 plate and a polarizing plate can be laminated on the gas barrier film of the present invention to prepare a circularly polarizing plate. In this case, they are laminated so that the angle formed by the slow axis of the λ/4 plate and the absorption axis of the polarizing plate should become 45°. As such a polarizing plate, one stretched along a direction at an angle of 45° with respect to the machine direction (MD) is preferably used, and for example, the one described in Japanese Patent Laid-open Publication No. 2002-865554 can be suitably used.

<Liquid Crystal Display Device>

A reflection type liquid crystal display device has, in the order from the bottom, a lower substrate, reflective electrode, lower oriented film, liquid crystal layer, upper oriented film, transparent electrode, upper substrate, λ/4 plate and polarizing film. The substrate of the present invention can be used as the aforementioned transparent electrode and upper substrate. In the case of a color display device, it is preferable to further provide a color filter layer between the reflective electrode and the lower oriented film or between the upper oriented film and the transparent electrode.

A transmission type liquid crystal display device has, in the order from the bottom, a back light, polarizing plate, λ/4 plate, lower transparent electrode, lower oriented film, liquid crystal layer, upper oriented film, upper transparent electrode, upper substrate, λ/4 plate, and polarization film. Among these, the substrate of the present invention can be used as the aforementioned upper transparent electrode and upper substrate. In the case of a color display device, it is preferable to further provide a color filter layer between the lower transparent electrode and the lower oriented film or between the upper oriented film and the transparent electrode.

Although type of liquid crystal cell is not particularly limited, more preferred are the TN (Twisted Nematic) type, STN (Supper Twisted Nematic) type, HAN (Hybrid Aligned Nematic) type, VA (Vertically Alignment) type, ECB (Electrically Controlled Birefringence) type, OCB (Optically Compensatory Bend) type and CPA (Continuous Pinwheel Alignment) type.

<Touch Panel>

As for a touch panel, the gas barrier film of the present invention can be applied to those described in Japanese Patent Laid-open Publication Nos. 5-127822, 2002-48913 and so forth.

<Organic EL Device>

The gas barrier film of the present invention can be particularly suitably used as a substrate for transparent electrode of organic EL device.

When the gas barrier film of the present invention is used as a substrate film and/or protective film of an organic EL device or the like, it is preferably used according to the disclosures of Japanese Patent Laid-open Publication Nos. 11-335661, 11-335368, 2001-192651, 2001-192652, 2001-192653, 2001-335776, 2001-247859, 2001-181616, 2001-181617, 2002-181816, and 2002-056976 as well as those of Japanese Patent Laid-open Publication Nos. 2001-148291, 2001-221916 and 2001-231443.

The gas barrier film and organic EL device of the present invention will be explained in detail with reference to the following examples. However, the present invention is not limited to these examples.

EXAMPLE 1

In Example 1, a polyimide film (UPILEX-R, Ube Industries) having a thickness of 100 μm (Tg: 285° C.) was used as a plastic base material for the present invention. In the comparative example, a polyethersulfone (PES) film having a thickness of 100 μm (Tg: 220° C.) and a ZEONOA film having a thickness of 100 μm (Tg: 160° C.) were used as a plastic base material.

1. Preparation of Inorganic Oxide Layer

As shown in FIG. 1, an inorganic layer was prepared by using a roll-to-roll type sputtering apparatus 1. This apparatus 1 had a vacuum chamber 2, and a drum 3 for cooling a plastic film (base material) 6 by contact on the surface was disposed at the center of the chamber. Further, a feeding roller 4 and rolling-up roller 5 for winding the plastic film 6 were disposed in the aforementioned vacuum chamber 2. The plastic film 6 wound around the feeding roller 4 was wound around the drum 3 via a guide roller 7, and further the plastic film 6 was wound around a roller 5 via a guide roller 8. As for a vacuum pumping system, the gas in the vacuum chamber 2 was always evacuated by the vacuum pumps 10 from exhaust ports 9. As for a film formation system, a target (not shown) was placed on a cathode 12 connected to an electric discharge power source 11 of the direct current system, which could apply pulse electric power. This electric discharge power source 11 was connected to a controller 13, and this controller 13 was further connected to a gas flow control unit 14, which supplied reactive gas to the vacuum chamber 2 through a piping 15 while controlling the introduced gas volume. Further, the vacuum chamber 2 was designed so that an electric discharge gas could be supplied to the chamber at a constant flow rate (not shown). Hereafter, specific conditions will be explained.

Si was set as a target, and a DC power source of the pulse applying type was prepared as the electric discharge power source 11. As the plastic film 6, the polyimide film having a thickness of 100 μm mentioned above was used, and this film was put on the feeding roller 4, and led to the winding roller 5. After the preparation of the base material in the sputtering apparatus 1 was finished, a door of the vacuum chamber 2 was closed, and the vacuum pump was operated to start evacuation and cooling of the drum. When the reached pressure became $4 \times 10^{-4}$ Pa, and the drum temperature became 5° C., running of the plastic film 6 was started. Argon was introduced as the electric discharge gas, and the electric discharge power source 11 was turned on to generate plasma on the Si target at an electric discharge power of 5 kW and a film formation pressure of 0.3 Pa and thereby perform presputtering for 3 minutes. Then, oxygen was introduced as a reactive gas. After the discharge was stabilized, argon and oxygen gas volumes were gradually decreased to lower the film formation pressure to 0.1 Pa. After stability of the discharge at 0.1 Pa was confirmed, formation of a silicon oxide film was performed for a certain period of time. After completion of the film formation, the internal pressure of the vacuum chamber 2 was returned to the atmospheric pressure, and the film on which the silicon oxide film was formed was taken out.

2. Preparation of Sol-gel Layer

In an amount of 8 g of SOARNOL D2908 (ethylene/vinyl alcohol copolymer produced by Nippon Synthetic Chemical Industry) was dissolved in a mixed solvent of 118.8 g of 1-propanol and 73.2 g of water at 80° C. In an amount of 10.72 g of this solution was added and mixed with 2.4 ml of 2 M/L (N) hydrochloric acid. This solution was added dropwise with 1 g of tetraethoxysilane with stirring and further stirred for 30 minutes. Then, the obtained coating solution was added with dimethylbenzylamine for pH adjustment and applied to the aforementioned sputtered inorganic oxide film by using a wire bar.

Then, the coated layer was dried at 140° C. to form a sol-gel layer having a film thickness of about 1 μm on the aforementioned inorganic oxide vapor-deposited base material. This was designated Film 1A.

In the same manner as described above except that the drying temperature was changed as shown in Table 1, Films 1B and 1C were prepared.

Films 1D to 1F and Films 1G to 1I were prepared in the same manner as Films 1A to 1C except that a polyethersulfone (PES) film and a ZEONOA film were used respectively instead of the polyimide film used in Films 1A to 1C.

Further, Film 1J was prepared in the same manner as Films 1A to 1C except that the inorganic vapor-deposited layer was not formed. Furthermore, Film 1K was prepared in the same manner as Films 1A to 1C except that the organic layer was not formed.

3. Measurement of Oxygen Permeability and Water Vapor Permeability

Oxygen permeability and water vapor permeability of the obtained films, Films 1A to 1K, were measured by the MOCON method at 23° C. and 90% of relative humidity and at 23° C. and 10% of relative humidity, respectively. The results are shown in Table 1.

TABLE 1

| Film | Drying temperature (° C.) | Oxygen permeability (mL/m$^2$ · day · atm) | Water vapor permeability (g/m$^2$ · day) | Remarks |
|---|---|---|---|---|
| 1A | 140 | 0.15 | 0.30 | Invention |
| 1B | 160 | 0.04 | 0.06 | Invention |
| 1C | 180 | Less than 0.005 | Less than 0.005 | Invention |
| 1D | 140 | 0.20 | 0.48 | Comparative |
| 1E | 160 | 0.06 | 0.09 | Comparative |
| 1F | 180 | Less than 0.005 | Less than 0.005 | Comparative |
| 1G | 140 | 0.29 | 0.65 | Comparative |
| 1H | 160 | 0.21 | 0.65 | Comparative |
| 1I | 180 | 0.20 | 0.64 | Comparative |
| 1J | 140 | 300 | 53.7 | Comparative |
| 1K | 140 | 10.1 | 9.2 | Comparative |

Note:
"Less than 0.005" means a permeability lower than detection limits of the currently available measurement apparatuses.

As shown in Table 1, when the polyimide having Tg of 250° C. or higher was used as the resin of the film base material (Films 1A to 1C), the oxygen permeability was lower than 0.15 mL/m$^2$·day·atm, and the water vapor permeability was lower than 0.30 g/m$^2$·day. On the other hand, when the polyethersulfon and ZEONOA having Tg lower than 250° C. was used (Films 1D to 1I), the oxygen permeability was higher than 0.20 mL/m$^2$·day·atm, and the water vapor permeability became higher than 0.48 g/m$^2$·day. Further, for the cases using the polyimide having Tg of 250° C. or higher, when a drying temperature for the organic layer of 150° C. or higher was used (Films 1B and 1C), the oxygen permeability and water vapor permeability were markedly improved compared with those obtained with the drying temperature lower than 150° C. (Film 1A). Furthermore, the films having only one of the organic layer and inorganic layer on the film base material (Films 1J and 1K) provided only high oxygen permeability and high water vapor permeability.

From the above, it can be seen that the gas barrier film of the present invention has superior gas barrier performance because it uses a film substrate having Tg of 250° C. and a combination of the inorganic layer and organic layer. Further, it can be seen that the gas barrier film of the present invention can have further superior gas barrier performance when the temperature of the drying step for the organic layer prepared by the sol-gel method is 150° C, or higher.

EXAMPLE 2

1. Preparation of Plastic Substrate

A resin represented by the formula (1) synthesized as follows (C-3, Tg: 270° C.) was dissolved in dichloromethane at a concentration of 15 weight % and cast on a stainless steel band by the die coating method. Then, the first film was stripped off from the band, and dried until the remaining solvent concentration became 0.08 weight %. Then, the film was trimmed and knurled for the both edges, and the film was rolled up to prepare Film 2A having a thickness of 100 μm.

Synthesis Example of C-3

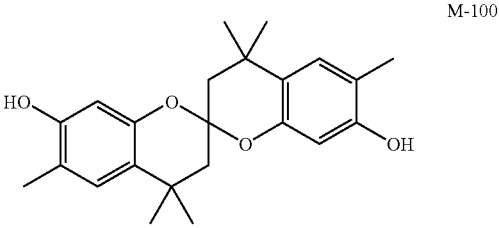

M-100

In an amount of 235.59 g (646.8 mmol) of M-100, 9.171 g (33 mmol) of tetrabutylammonium chloride, 2805 mL of dichloromethane and 2475 mL of water were put into a reaction vessel provided with a stirrer and stirred at 300 rpm on a water bath under a nitrogen flow. After 30 minutes, 134.05 g (660 mmol) of terephthaloyl chloride was added as powder and washed away with 330 mL of dichloromethane. After 10 minutes, a solution obtained by dissolving 3.966 g (26.4 mmol) of p-tert-butylpheriol in 693 mL of 2 M (2 N) aqueous sodium hydroxide and diluting the resultant with 132 mL of water was added dropwise to the reaction mixture over 1 hour using a dropping apparatus, and then the reaction mixture was washed with 165 mL of water. Thereafter, stirring was continued for 3 hours, then 1 L of dichloromethane was added, and the organic phase was separated. Further, the organic phase was washed by adding a solution obtained by diluting 6.6 mL of 12 M (12 N) aqueous hydrochloric acid with 2.5 L of water. Washing was further performed twice with 2.5 L of water, and the separated organic phase was added with 1 L of dichloromethane for dilution and poured into 25 L of vigorously stirred methanol over 1 hour. The white precipitates obtained in the methanol were collected by filtration, dried by heating at 40° C. for 12 hours, and then dried at 70° C. for 3 hours under reduced pressure to obtain 307.2 g of the objective compound C-3.

The molecular weight of the obtained compound C-3 was measured by GPC (THF solvent), and as a result, the weight average molecular weight was found to be 61,000.

Further, Films 2B, 2C and 2D were prepared in the same manner as that used for Film 2A mentioned above except that the resins F-3, FL-1 and FL-7 represented by the formula (1) or (2) prepared as follows were used.

Synthesis Example of F-3

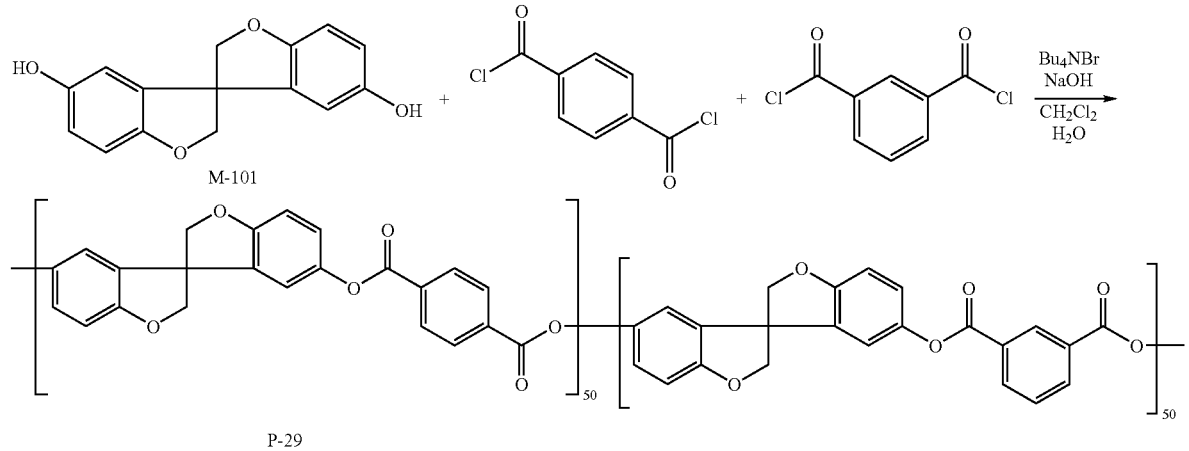

In a volume of 113 mL of water in which 0.09 g of sodium hydrosulfite and 0.42 g of tetrabutylammonium bromide were dissolved was added to a suspension in which 7.69 g of M-101 was suspended in 98 mL of methylene chloride and stirred vigorously. Then, 31.5 ml of 2 M NaOH aqueous solution and a solution of 1.52 g of terephthaloyl chloride and 1.52 g of isophthaloyl chloride in 20 mL of methylene chloride were simultaneously added to the mixture over 1 hour at room temperature. After the addition, the reaction was further allowed for 6 hours, and the organic layer was separated by phase separation operation. Further, the organic layer was washed twice with 300 mL of diluted hydrochloric acid, and methylene chloride was evaporated under reduced pressure. In a volume of 20 mL of methylene chloride was added to the residue to dissolve it, and the solution was filtered to remove dusts and then slowly poured into 200 mL of methanol. The deposited resin was collected by filtration, washed with methanol and dried to obtain 10.5 g of the objective compound F-3 as white solid.

The obtained resin had a weight average molecular weight of 50,500 and Tg of 262° C. Moreover, the NMR spectrum of the obtained resin was as follows.

$^1$H-NMR: ($\delta$ in $CDCl_3$) 4.60 (dd), 6.87 (dd), 6.96 (d), 7.04 (dd), 7.59 (m), 8.21 (d), 8.34 (br. d), 8.86 (br. s)

Synthesis Example of FL-1

A polyarylate derived from fluorenebisphenolisophthalic acid/terephthalic acid (FL-1) was synthesized by the following method.

BPFL (trade name, JFE Chemical) was recrystallized twice from acetonitrile and vacuum-dried at 70° C. for 3 hours with heating to obtain a fluorene compound A-1 with an HPLC purity of 99.9% or higher (containing 8.6 weight % of acetonitrile).

In an amount of 253.03 g (660 mmol) of A-1 obtained above, 9.171 g (33 mmol) of tetrabutylammonium chloride, 2227 mL of dichloromethane and 2475 mL of water were put into a reaction vessel provided with a stirrer and stirred at 300 rpm on a water bath under a nitrogen flow. After 30 minutes, a solution in which 67.0 g (330 mmol) of isophthaloyl chloride and 67.0 g (330 mmol) of terephthaloyl chloride were dissolved in 743 mL of dichloromethane and a solution obtained by diluting 693 mL of 2 M (2 N) aqueous sodium hydroxide with 132 mL of water were simultaneously added dropwise over 1 hour by using separate dropping apparatuses, and after completion of the addition, they were washed away with 165 mL of water and 165 mL of dichloromethane, respectively. Then, after stirring was continued for 3 hours, 1 L of dichloromethane was added, and the organic phase was separated. Further, a solution obtained by diluting 6.6 mL of 12 M (12 N) aqueous hydrochloric acid with 2.5 L of water was added to wash the organic phase. The organic phase was further washed twice with 2.5 L of water, and then 1 L of dichloromethane was added to the separated organic phase for dilution and then poured into 25 L of vigorously stirred methanol over 1 hour. The obtained white precipitates were collected by filtration, dried by heating at 40° C. for 12 hours, and then dried at 70° C. for 3 hours under reduced pressure to obtain 286 g of the objective compound FL-1.

The molecular weight of FL-1 obtained above was measured by GPC (THF solvent), and as a result, the weight average molecular weight was found to be 258,000. Further, Tg was 324° C. as measured by DSC.

Synthesis Example of FL-7

BPFL (trade name, JFE Chemical) was recrystallized twice from acetonitrile and vacuum-dried at 70° C. for 3 hours with heating to obtain a fluorene compound A-1 with an HPLC purity of 99.9% or higher (containing 8.6 weight % of acetonitrile).

In an amount of 253.03 g (660 mmol) of A-1 obtained above, 9.171 g (33 mmol) of tetrabutylammonium chloride, 2805 mL of dichloromethane and 2475 mL of water were put into a reaction vessel provided with a stirrer and stirred at 300 rpm on a water bath under a nitrogen flow. After 30 minutes, 167.03 g (660 mmol) of 2,6-naphthalenedicarboxylic acid chloride was added as powder, and washed away with 330 mL of dichloromethane. After 10 minutes, a solution obtained by diluting 693 mL of 2 M (2 N) aqueous sodium hydroxide with 132 mL of water was added dropwise to the reaction mixture over 1 hour using a dropping apparatus, and after completion of the addition, the reaction mixture was washed with 165 mL of water. Thereafter, stirring was continued for 3 hours, then 1 L of dichloromethane was added, and the organic phase was separated.

Further, the organic phase was washed by adding a solution obtained by diluting 6.6 mL of 12 M (12 N) aqueous hydrochloric acid with 2.5 L of water. The organic phase was further washed twice with 2.5 L of water, and the separated organic phase was added with 1 L of dichloromethane for dilution and poured into 25 L of vigorously stirred methanol over 1 hour.

The obtained white precipitates were collected by filtration, dried by heating at 40° C. for 12 hours, and then dried at 70° C. for 3 hours under reduced pressure to obtain 302 g of the objective compound FL-7.

The molecular weight of the obtained compound FL-7 was measured by GPC (THF solvent), and as a result, the weight average molecular weight was found to be 170,000. Further, Tg was 3699C as measured by DSC.

2. Preparation of Inorganic Layer and Organic Layer

On each of Films 2A to 2D mentioned above, an inorganic oxide layer was formed in the same manner as in Example 1. Then, 1 weight % of a radical initiator (Irgacure 651, Ciba-Geigy) was added to a solution obtained by mixing (a) tetraethylene glycol diacrylate, (b) caprolactone acrylate and (c) tripropylene glycol monoacrylate in a weight ratio of 7:1.2:1.4, dissolved in the solvent, and applied on each of Films 2A to 2D on which an inorganic oxide layer was formed, dried and then cured by UV irradiation to prepare an organic layer having a thickness of about 2 μm on the inorganic oxide layer.

The above operation was repeated to prepare a film having a 6-layer structure, and oxygen permeability and water vapor permeability thereof was measured in the same manner as in Example 1 and evaluated. The results are shown in Table 2.

A laminate film, Films 2E to 2G, were prepared in the same manner as Film 2A except that a marketed polycarbonate film (Yupiron, Mitsubishi Gas Chemical, Tg: 140° C.), a polyetherfulfon and a polyimide (UPILEX-R, Ube Industries, Tg: 285° C.) were used instead of the resin compound C-3, and oxygen permeability and water vapor permeability thereof were measured in the same manner as in Example 1 and evaluated. The results are shown in Table 2.

TABLE 2

| Film | Resin base material | | Oxygen permeability (mL/m² · day · atm) | Water vapor permeability (g/m² · day) | Remarks |
|---|---|---|---|---|---|
| | Resin compound | Tg (° C.) | | | |
| 2A | C-3 | 270 | 0.01 | Less than 0.005 | Invention |
| 2B | F-3 | 260 | 0.01 | Less than 0.005 | Invention |
| 2C | FL-1 | 320 | Less than 0.005 | Less than 0.005 | Invention |
| 2D | FL-7 | 360 | Less than 0.005 | Less than 0.005 | Invention |
| 2E | PC | 140 | 0.3 | 0.88 | Comparative |
| 2F | PES | 230 | 0.2 | 0.30 | Comparative |
| 2G | polyimide | 285 | 0.1 | 0.08 | Invention |

Note:
"Less than 0.005" means a permeability lower than detection limits of the currently available measurement apparatuses.

As shown in Table 2, the films using a resin represented by the formula (1) or (2) of the present invention (Films 2A to 2D and 2G) showed lower oxygen permeability and lower water vapor permeability compared with the comparative example (Films 2E and 2F). Further, it can be seen that when Films 2A to 2C of Example 2 were used, higher barrier performance was obtained compared with that obtained with the film of Example 1. This is because the resins represented by the formula (1) or (2) of the present invention have a high Tg and therefore can maintain smoothness of the base material during the vapor deposition, and thus adhesion with the inorganic layer is further improved.

EXAMPLE 3

Films 3A to 3G were prepared by laminating one inorganic layer consisting of inorganic oxide and one organic layer consisting of an acrylate resin on Film 2A to 2D prepared in Example 2 according to the method described in International Patent Application Laid-open in Japanese No. 2002-532850. Then, water vapor permeability was measured at 45° C. and 100% of relative humidity and evaluated. The results of measured water vapor permeability are shown in Table 3.

The gas barrier film disclosed in International Patent Application Laid-open in Japanese No. 2002-532850 was prepared, and water vapor permeability thereof was measured in the same manner as in Example 3. The result of measured water vapor permeability is shown in Table 3.

TABLE 3

| Film | Water vapor permeability (g/m² · day) | Remarks |
|---|---|---|
| 3A | 0.02 | Invention |
| 3B | 0.01 | Invention |
| 3C | 0.03 | Invention |
| 3D | 0.02 | Invention |
| 3E | 0.30 | Comparative |
| 3F | 0.20 | Comparative |
| 3G | 0.04 | Invention |
| PET[*1)] | 0.57 | Comparative |

[*1)]Film described in International Patent Application Laid-open in Japanese No. 2002-532850

From the results shown in Table 3, it can be seen that the gas barrier films of the present invention showed markedly lower water vapor permeability compared with the gas barrier film of International Patent Application Laid-open in Japanese No. 2002-532850. From this result, it can be seen that the gas barrier films of the present invention have markedly superior gas barrier performance compared with the gas barrier film of International Patent Application Laid-open in Japanese No. 2002-532850.

EXAMPLE 4

In order to investigate effect of the organic layer (sol-gel layer) obtained by the sol-gel method on the films, the following evaluation was performed.

On Film 1A prepared in Example 1, an organic layer was formed in the same manner as in Example 2 to prepare Film 4A. Further, in the same manner as in Example 2, on a base material film (PES), an inorganic oxide thin film layer was vapor-deposited, and then an organic layer was formed to prepare Film 4B.

Oxygen permeability and water vapor permeability of Films 4A and 4B obtained above were measured and evaluated. The measured oxygen permeability and water vapor permeability are shown in Table 4.

TABLE 4

| Film | Oxygen permeability (mL/m² · day · atm) | Water vapor permeability (g/m² · day) | Remarks |
|---|---|---|---|
| 4A | 0.02 | 0.02 | Invention |
| 4B | 0.10 | 0.21 | Invention |

From the results shown in Table 4, it can be seen that, in the present invention, a film in which a sol-gel layer is provided and then an inorganic oxide layer is vapor-deposited like Film 4A shows more superior gas barrier performance compared with Film 4B in which a sol-gel layer is not provided.

In addition, gas permeability was also measured for a gas barrier film prepared in the same manner as Film 4A except that an organic layer was formed by the method of Example 2 on the film substrate instead of the sol-gel layer. However, such marked improvement effect as in Film 4A having a sol-gel layer could not be obtained.

EXAMPLE 5

1. Preparation of Organic EL Devices

Film 3A was introduced into a vacuum chamber, and a transparent electrode composed of an IXO thin film having a thickness of 0.2 μm was formed by DC magnetron sputtering using an IXO target. An aluminum lead wire was connected to the transparent electrode (IXO) to form a laminated structure. An aqueous dispersion of polyethylene dioxythiophene/polystyrenesulfonic acid (Baytron P, BAYER, solid content: 1.3 weight %) was applied on the surface of the transparent electrode by spin coating and vacuum-dried at 150° C. for 2 hours to form a hole transporting organic thin film layer having a thickness of 100 nm. This was designated Substrate X.

Further, a coating solution for light-emitting organic thin film layer having the following composition was applied on one side of a temporary support made of polyethersulfone having a thickness of 188 μm (SUMILITE FS-1300, Sumitomo Bakelite) by using a spin coater and dried at room temperature to form a light-emitting organic thin film layer having a thickness of 13 nm on the temporary support. This was designated Transfer Material Y.

| | |
|---|---|
| Polyvinyl carbazole (Mw = 63000, Aldrich) | 40 parts by weight |
| Tris(2-phenylpyridine) iridium complex (Ortho-metalated complex) | 1 part by weight |
| Dichloroethane | 3200 parts by weight |

The light-emitting organic thin film layer side of Transfer Material Y was overlaid on the upper surface of the organic thin film layer of Substrate X, heated and pressurized under the conditions of 160° C., 0.3 MPa and 0.05 m/min by using a pair of heat rollers, and the temporary support was delaminated to form a light-emitting organic thin film layer on the upper surface of Substrate X. This was designated Substrate XY.

Further, a patterned mask for vapor deposition (mask providing a light-emitting area of 5 mm×5 mm) was set on one side of a polyimide film (UPILEX-50S, Ube Industries) cut into a 25-mm square and having a thickness of 50 μm, and Al was vapor-deposited in a reduced pressure atmosphere of about 0.1 MPa to form an electrode having a film thickness of 0.3 μm. $Al_2O_3$ was vapor-deposited by DC magnetron sputtering using an $Al_2O_3$ target with a film thickness of 3 nm in the same pattern as the Al layer. An aluminum lead wire was connected to the Al electrode to form a laminated structure, A coating solution for electron transporting organic thin film layer having the following composition was applied on the obtained laminated structure by using a spin coater and vacuum-dried at 80° C. for 2 hours to form an electron transporting organic thin film layer having a thickness of 15 nm on $Al_2O_3$. This was designated Substrate Z.

| | |
|---|---|
| Polyvinyl butyral (2000L produced by Denki Kagaku Kogyo, Mw = 2000,) | 10 parts by weight |
| 1-Butanol | 3500 parts by weight |
| Electron transporting compound having the following structure | 20 parts by weight |

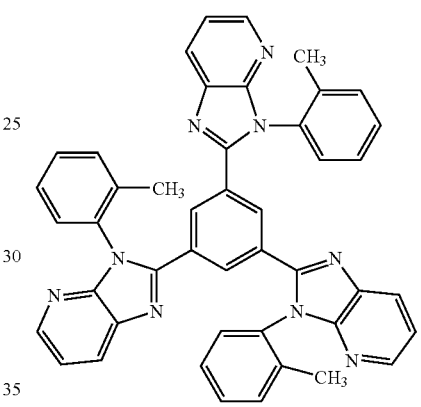

Substrate XY and Substrate Z were stacked so that the electrodes should face each other via the light-emitting organic thin film layer between them, heated and pressurized at 160° C., 0.3 MPa and 0.05 m/min by using a pair of heat rollers to obtain Organic EL Device 1.

As a comparative organic EL device, Organic EL Device 2 was also prepared by using Film 3E in the production of Substrate X.

2. Test

DC voltage was applied to the obtained Organic EL Devices 1 and 2 by using Source-Measure Unit Model 2400 (Toyo Corporation) to allow them to emit light. Both of Organic EL Devices 1 and 2 favorably emitted light.

After the production of organic EL Devices 1 and 2, they were left at 25° C. and relative humidity of 75% for 1 month, and then similarly allowed to emit light. As a result, Organic EL Device 1 similarly showed favorable light emission, whereas defects increased in Organic EL device 2.

EXAMPLE 6

1. Preparation of Organic EL Device Assuming Disposition of TFT

Organic EL Device 3A was prepared in the same manner as in Example 5 except that a heat treatment was performed at 230° C. for 30 minutes assuming disposition of TFT after a transparent electrode was formed on Film 3A (Tg of the resin base material: 270°).

Further, Organic EL Device 3W was prepared in the same manner as that used for Organic EL Device 3A except that an inorganic oxide layer and a sol-gel layer were formed under the same conditions as those used for Film 1F of Example 1 on a film utilizing Polyimide 1 having the following structure (Tg: 285° C.).

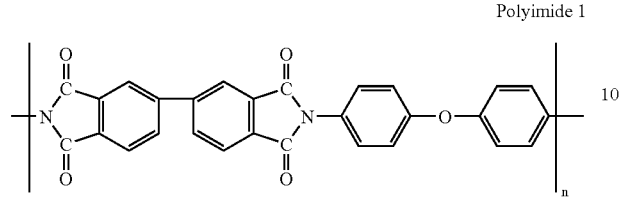

Polyimide 1

Furthermore, Organic EL Device 3D was prepared in the same manner as that used for Organic EL Device 3A except that the base material was changed to Film 3D and the heat treatment was changed to a heat treatment at 300° C. for 1 hour.

Moreover, it was attempted to prepare an organic EL device as a comparative organic EL device in the same manner as that used for Organic EL Device 3A except that Film 1F (Tg of the resin base material: 160°) was used. However, Film 1F markedly deformed after the heat treatment, and thus an organic EL device could not be produced.

2. Test

DC voltage was applied to the obtained Organic EL Devices 3A, 3D and 3W by using Source-Measure Unit Model 2400 (Toyo Corporation) to allow them to emit light. All of the organic EL devices emitted light.

This shows that the gas barrier film of the present invention functions as a substrate film for organic EL devices even if a heat treatment assuming a TFT step is performed.

The present disclosure relates to the subject matter contained in Japanese Patent Application No. 342062/2003 filed on Sep. 30, 2003 and Japanese Patent Application No. 036736/2004 filed on Feb. 13, 2004, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A gas barrier film comprising a resin base material having a glass transition temperature of 250° C. or higher on which there are at least one inorganic layer and at least one organic layer alternately disposed,
wherein the resin has a spiro structure represented by the following formula (1) or a cardo structure represented by the following formula (2):

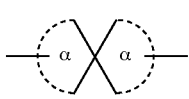

Formula (1)

wherein the rings α represent a monocyclic or polycyclic ring, and two of the rings are bound via a spiro bond,

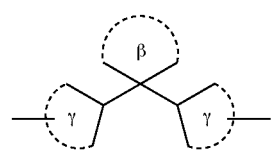

Formula (2)

wherein the ring β and the rings γ represent a monocyclic or polycyclic ring, and two of the rings γ may be identical or different and bond to one quaternary carbon atom in the ring β.

2. The gas baffler film according to claim 1, wherein the resin has a spiro structure represented by the formula (1).

3. The gas baffler film according to claim 2, wherein the resin has a spiro structure represented by the following formula (3):

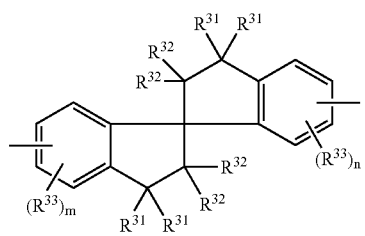

Formula (3)

wherein $R^{31}$, $R^{32}$ and $R^{33}$ each independently represent hydrogen atom or a substituent, groups of each type may bond to each other to form a ring, and m and n represent an integer of 1 to 3.

4. The gas barrier film according to claim 2, wherein the resin has a spiro structure represented by the following formula (4):

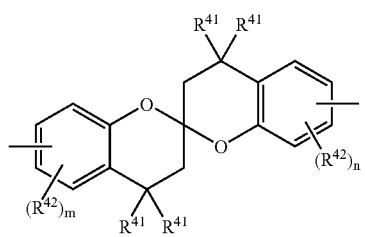

wherein $R^{41}$ and $R^{42}$ each independently represent hydrogen atom or a substituent, groups of each type may bond to each other to form a ring, and m and n represent an integer of 1 to 3.

5. The gas barrier film according to claim 2, wherein the resin has a spiro structure represented by the following formula (5):

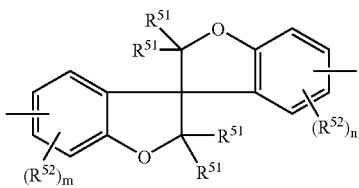

Formula (5)

wherein $R^{51}$ and $R^{52}$ each independently represent hydrogen atom or a substituent, groups of each type may bond to each other to form a ring, and m and n represent an integer of 1 to 3.

6. The gas barrier film according to claim 1, wherein the resin has a cardo structure represented by the formula (2).

7. The gas barrier film according to claim 6, wherein the resin has a cardo structure represented by the following formula (6):

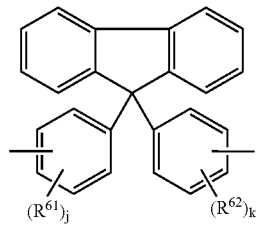

Formula (6)

wherein $R^{61}$ and $R^{62}$ each independently represent hydrogen atom or a substituent, groups of each type may bond to each other to form a ring, and j and k represent an integer of 1 to 4.

8. The gas barrier film according to claim 1, wherein the resin is a polycarbonate, polyester, polyamide, polyimide or polyurethane having a spiro structure represented by the formula (1) or a cardo structure represented by the formula (2).

9. The gas barrier film according to claim 1, wherein the resin is an aromatic polyester having a spiro structure represented by the formula (1) or a cardo structure represented by the formula (2).

10. The gas barrier film according to claim 1, wherein the inorganic layer contains a silicon oxide or a silicon oxynitride.

11. The gas barrier film according to claim 1, wherein the organic layer contains as a main component a crosslinked polymer compound obtained by polymerization of multifunctional monomers having an acryloyl group or a methacryloyl group.

12. The gas barrier film according to claim 1, wherein the organic layer is obtained by applying a solution containing a polymer having a hydrogen bond-forming group and a metal alkoxide and drying the solution.

13. The gas barrier film according to claim 1, which has an oxygen permeability of 0.02 mL/m²·day·atm or lower at 23° C. and 90% of relative humidity, and a water vapor permeability of 0.02 g/m²·day or lower at 23° C. and 100% of relative humidity.

14. An image display device having the gas barrier film according to claim 1.

15. An organic electroluminescence device having the gas barrier film according to claim 1.

* * * * *